United States Patent
Ford et al.

(10) Patent No.: US 6,704,476 B2
(45) Date of Patent: Mar. 9, 2004

(54) OPTICAL MEMS SWITCH WITH IMAGING SYSTEM

(75) Inventors: Joseph Earl Ford, Del Mar, CA (US); Randy Clinton Giles, Whippany, NJ (US); David Thomas Neilson, Old Bridge, NJ (US); Roland Ryf, Aberdeen, NJ (US)

(73) Assignees: Lucent Technologies Inc., Murray Hill, NJ (US); Agere Systems Inc., Allentown, PA (US)

(*) Notice: Subject to any disclaimer, the term of this patent is extended or adjusted under 35 U.S.C. 154(b) by 0 days.

(21) Appl. No.: 09/895,949

(22) Filed: Jun. 29, 2001

(65) Prior Publication Data

US 2003/0002781 A1 Jan. 2, 2003

(51) Int. Cl.[7] .............................. G02B 6/42; G02B 6/26
(52) U.S. Cl. ............................. 385/18; 385/15; 385/16; 385/17; 385/31; 385/33; 385/39; 398/45; 398/50; 359/388; 359/877
(58) Field of Search .................... 385/15–18, 31, 385/33, 39; 398/45, 50; 359/388, 877

(56) References Cited

U.S. PATENT DOCUMENTS

| | | | | |
|---|---|---|---|---|
| 5,875,271 A | * | 2/1999 | Laughlin | 385/16 |
| 5,974,207 A | * | 10/1999 | Aksyuk et al. | 385/16 |
| 6,097,859 A | * | 8/2000 | Solgaard et al. | 385/17 |
| 6,188,814 B1 | * | 2/2001 | Bhalla | 385/134 |
| 6,248,509 B1 | * | 6/2001 | Sanford | 430/396 |
| 6,256,131 B1 | * | 7/2001 | Wine et al. | 310/308 |
| 6,330,102 B1 | * | 12/2001 | Daneman et al. | 359/290 |
| 6,335,782 B1 | * | 1/2002 | Holmes | 359/139 |
| 6,347,002 B1 | * | 2/2002 | Hagelin et al. | 359/198 |
| 6,407,851 B1 | * | 6/2002 | Islam et al. | 359/139 |
| 6,408,120 B1 | * | 6/2002 | Dautartas | 385/52 |
| 6,434,291 B1 | * | 8/2002 | Kessler et al. | 385/24 |
| 6,456,751 B1 | * | 9/2002 | Bowers et al. | 385/16 |
| 6,470,107 B2 | * | 10/2002 | Brockett et al. | 385/16 |
| 6,487,334 B2 | * | 11/2002 | Ducellier et al. | 385/22 |
| 6,539,142 B2 | * | 3/2003 | Lemoff et al. | 385/18 |
| 6,549,691 B1 | * | 4/2003 | Street et al. | 385/18 |
| 6,549,692 B1 | * | 4/2003 | Harel et al. | 385/18 |
| 6,574,026 B2 | * | 6/2003 | Jin et al. | 359/224 |
| 2002/0008091 A1 | * | 1/2002 | Brandinger et al. | |
| 2002/0105725 A1 | * | 8/2002 | Sweatt et al. | |
| 2002/0164114 A1 | * | 11/2002 | Golub et al. | 385/18 |

FOREIGN PATENT DOCUMENTS

| | | | | |
|---|---|---|---|---|
| CA | 2338934 A1 | * | 5/2002 | G02B/26/08 |
| EP | 1 102 096 | | 5/2001 | G02B/6/35 |

* cited by examiner

*Primary Examiner*—Brian Healy
*Assistant Examiner*—Daniel Petkovsek
(74) *Attorney, Agent, or Firm*—Eugene J. Rosenthal

(57) ABSTRACT

In an all optical switch an imaging system is interposed between the micro lens array and the moveable micro mirrors of a MEMS device to which, or from which, the light beams are directed. This causes an image of the micro lens array to be formed at the MEMS device, or vice-versa, thus effectively eliminating the distance between the micro lens array and the MEMS device. The imaging system may be a telecentric system. The size of the arrangement may be reduced by compacting the optical path, e.g., using appropriate conventional mirrors, and/or employing folded arrangements, i.e., arrangements in which there is only one MEMS device stage that does double duty for both input and output through the use of at least one conventional mirror. The overall system is arranged to account for any inversions introduced.

28 Claims, 9 Drawing Sheets

OPTICAL MEMS SWITCH WITH IMAGING SYSTEM

TECHNICAL FIELD

This invention relates to the art of optical microelectromechanical systems (MEMS) devices, and more particularly, to all-optical switching using MEMS devices.

BACKGROUND OF THE INVENTION

One solution for all-optical switching employs two MEMS devices each containing an array of tiltable micro mirrors, e.g., small mirrors, which can reflect light, which herein refers to any radiation in the wavelength of interest, whether or not in the visible spectrum. An optical path is established for light supplied from an input source, e.g., an optical fiber, to an output, e.g., an output fiber, by steering the light using a first micro mirror on the first optical MEMS device, the first micro mirror being associated with the input fiber, onto a second micro mirror on the second optical MEMS device which is associated with the output fiber. The second micro mirror then steers the light into the output fiber. Each fiber connected to the system is considered a port of the system, the input fibers being the input ports and the output fibers being the output ports.

Often, the light to be steered from the input fiber onto the first micro mirror of the first optical MEMS device first passes through a micro lens that is associated therewith and is part of an input micro lens array. The function of each micro lens is to collimate the beam of light supplied from its respective associated input fiber. Alternatively, in lieu of employing a separate micro lens array, a respective lens may be integrated with each fiber of the fiber bundle in an arrangement that forms a collimator. Similar arrangements of micro lens arrays or integrated lenses are also found interposed between the output MEMS device and the output fiber bundle in the output section of the all-optical switch. In the output section, the function of each micro lens or collinator is to couple the light beam into its respective associated output fiber.

A problem in the art of all-optical switching using MEMS devices is that the center of any particular micro lens may not be lined up exactly with the center of its corresponding optical fiber. This causes the light beam to have a directional error, in that it does not travel directly toward the center of its associated micro mirror. If the distance between the micro lens and the MEMS device is large, which may be necessary to keep the input fiber bundle from blocking beams which are reflected from the micro mirrors of the MEMS device, the light beam will hit the micro mirror, if at all, off center. As a result, either no light will be reflected from the micro mirror if the beam does not hit the micro mirror at all, or the beam that is reflected will only represent part of the original beam, in that the part of the light beam that does not hit the micro mirror will be cut off, which results in attenuation of the light beam.

Similarly, in the output section, light which is reflected from an output micro mirror may not hit the micro lens, and as a result, will not be coupled into the output fiber. Alternatively, only part of the light may hit the micro lens, so that at most that part of the light could be coupled into the fiber. This results in attenuation of the light beam. Furthermore, even if the light hits the output micro lens, if the light comes in with an angle other than being parallel to the axis from the center of the micro lens to the fiber, then not all of the light reaching the micro lens will be coupled into the output fiber. Again, this results in attenuation of the light beam.

In other implementations of the all-optical switch, a micro lens array is not employed. Instead, each fiber has a lens integrated with it, to form a collimator, so that the light comes out as a parallel beam. While the fibers of the optical bundle may be made very regular, the direction in which the collimator lens is pointing may not be parallel to the line formed by the center of the lens and its associated micro mirror. This angle is often set by the angle of housing in which the collimators are mounted. If the angle of the lens is not parallel to the line formed by the center of the lens and its associated micro mirror, the light beam will have a directional error, in that it does not travel directly toward the center of its associated micro mirror. If the distance between the collimator and the MEMS device is large, which may be necessary to keep the input fiber bundle from blocking beams which are reflected from the micro mirrors of the MEMS device, the light beam will hit the micro mirror, if at all, off center. As a result, either no light will be reflected from the micro mirror if the beam does not hit the micro mirror at all, or the beam that is reflected will only represent part of the original beam, in that the part of the light beam that does not hit the micro mirror will be cut off, which results in attenuation of the light beam.

Similarly, in the output section, light which is reflected from an output micro mirror may not hit the collimator lens, and as a result, will not be coupled into the output fiber. Alternatively, only part of the light may hit the collimator lens, so that at most that part of the light could be coupled into the fiber. This results in attenuation of the light beam. Furthermore, even if the light hits the output micro lens, if the light comes in with an angle other than being parallel to the axis from the center of the micro lens to the fiber, then not all of the light reaching the micro lens will be coupled into the output fiber. Again, this results in attenuation of the light beam.

The same type of problem is manifest when using a wave guide in lieu of a fiber bundle.

Although It is easy enough to perform the alignment to insure that the light beam follows the desired path when there is only a single input fiber or a single output fiber. However, when there is a bundle of input or output fibers—which may include a thousand or more fibers—getting all the beams to be parallel is a very difficult task.

SUMMARY OF THE INVENTION

We have recognized that the foregoing problem of multiple light beams not being parallel and/or having an undesirable angle when they leave their source can be overcome by interposing an imaging system between the micro lens array and/or the collimators and the moveable micro mirrors of the MEMS device to which, or from which, the light beams are directed. Such an arrangement causes an image of the micro lens array and/or the collimators to be formed at the MEMS device, or vice-versa, due to the reversible nature of optics, thus effectively eliminating the distance between the micro lens array and/or the collimators and the MEMS device over which the light beams had previously traveled. Thus, advantageously, each light beam, even if not traveling in the desired direction parallel to the line formed by the center of its lens or collimator and its associated micro mirror does not get the opportunity to travel away from its intended target.

In one embodiment of the system, the imaging system reproduces the angle of reflection of the light from the first micro mirror, which may be achieved using a telecentric system, also known as a 4 f system. The physical size of the arrangement may be reduced by compacting the optical path, e.g., using appropriate conventional mirrors, and/or employing folded arrangements, i.e., arrangements in which there is only one MEMS device stage that does double duty for both input and output through the use of at least one conventional mirror. The overall system is arranged to account for any inversions introduced.

DETAILED DESCRIPTION

Figure 1:
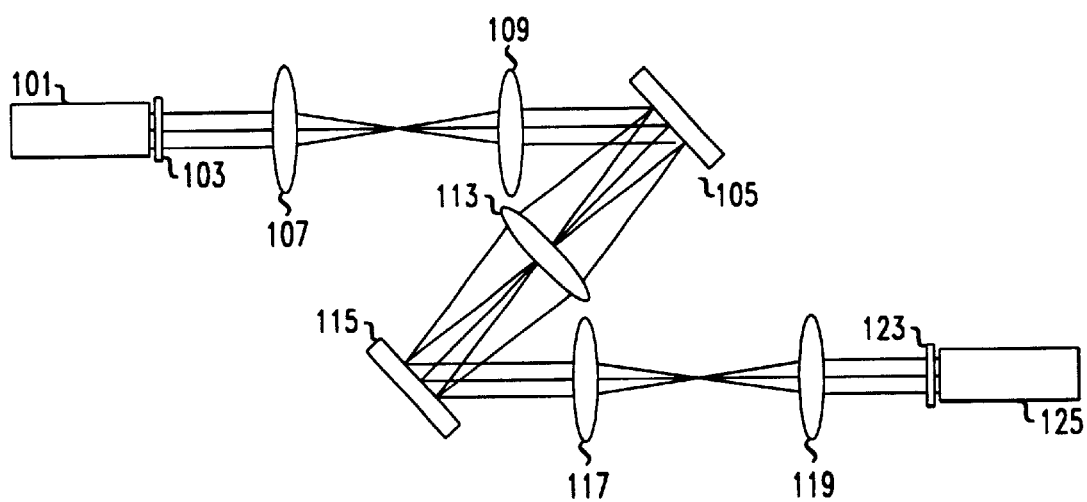
FIG. 1 shows an exemplary arrangement for performing optical switching in accordance with the principles of the invention.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGS., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

Software modules, or simply modules which are implied to be software, may be represented herein as any combination of flowchart elements or other elements indicating performance of process steps and/or textual description. Such modules may be executed by hardware which is expressly or implicitly shown.

Unless otherwise explicitly specified herein, the drawings are not drawn to scale.

Additionally, unless otherwise explicitly specified herein, any lens shown and/or described herein is actually an optical system having the particular specified properties of that lens. Such an optical system may be implemented by a single lens element but is not necessarily limited thereto. Similarly, where a mirror is shown and/or described what is actually being shown and/or described is an optical system with the specified properties of such a mirror, which may be implemented by a single mirror element but is not necessarily limited to a single mirror element. This is because, as is well known in the art, various optical systems may provide the same functionality of a single lens element or mirror but in a superior way, e.g., with less distortion. Furthermore, as is well known in the art, the functionality of a curved mirror may be realized via a combination of lenses and mirrors and vice versa. Moreover, any arrangement of optical components that are performing a specified function, e.g., an imaging system, gratings, coated elements, and prisms, may be replaced by any other arrangement of optical components that perform the same specified function. Thus, unless otherwise explicitly specified here, all optical elements or systems that are capable of providing specific function within an overall embodiment disclosed herein are equivalent to one another for purposes of the present disclosure.

The term micro-electromechanical systems (MEMS) device as used herein is intended to mean an entire MEMS device or any portion thereof. Thus, if a portion of a MEMS device is inoperative, or if a portion of a MEMS device is occluded, such a MEMS device is nonetheless considered to be a MEMS device for purposes of the present disclosure.

FIG. 1 shows an exemplary arrangement for performing optical switching in accordance with the principles of the invention. Shown in FIG. 1 are a) input fiber bundle 101, b) input micro lens array 103, c) input MEMS device 105, d) lens 107, e) lens 109, f) lens 113, g) output MEMS device 115, h) lens 117, i) lens 119, j) output micro lens array 123, and k) output fiber bundle 125.

Input fiber bundle 101 supplies optical signals to be switched. More specifically, each fiber of input fiber bundle 101 is an input port to the switching system of FIG. 1. The light supplied by each fiber of fiber bundle 101 passes through a respective corresponding micro lens that is part of micro lens array 103. The function of each micro lens is to collimate the beam of light supplied from its respective associated input fiber. In alternative embodiments of the invention, in lieu of employing a separate micro lens array, a lens may be integrated with each fiber of fiber bundle 101 in an arrangement that forms a collimator, so that the light comes out as a parallel beam.

In accordance with the principles of the invention, the beams of light passing from micro lens array 103 each falls upon the imaging system made up of lenses 107 and 109, entering at lens 107 and exiting at lens 109. The imaging system is arranged so as to cause an image of the micro lens array and/or the collimators to be formed at input MEMS device 105, or vice-versa, due to the reversible nature of optics, thus effectively eliminating the distance between micro lens array and/or collimators 103 and input MEMS device 105 over which the light beams had effectively traveled in prior art arrangements. Thus, advantageously, each light beam, even if not traveling in the desired direction parallel to the line formed by the center of its micro lens or collimator and its associated micro mirror does not get the opportunity to travel away from its intended target.

Note that although two lenses are shown making up the imaging system, this is for pedagogical and clarity purposes only. Those of ordinary skill in the art will readily appreciate that any imaging system, e.g., a system using one or more lenses, may be employed.

In one embodiment of the invention, a telecentric system, also known as a 4 f system is employed as the imaging system. By using a telecentric system, such systems being well known in the art, the angle of each beam as it exits from each of micro lens 107 is reproduced when that light reaches input MEMS device 105. However, advantageously, this angle is reproduced directly at the plane of input MEMS device 105. As a result, the light beams do not have the ability to travel along the line of that angle and thus do not have the opportunity afforded to them of missing, in whole or in part, the micro mirror which is supposed to reflect them.

Note that since the telecentric system may be inverting the respective corresponding micro mirrors of input MEMS device 105 may not be in the exact same location, e.g., on a direct line from input fiber bundle 101 as they would have been had the imaging system not been employed. The imaging system may also change the size of the image as compared with the original. This would allow the micro mirrors of input MEMS device 105 to have a different size and/or spacing than that of micro lens array and/or collimators 103. It would also allow the use of a fiber bundle without a micro lens array and/or collimators if the fill factor, i.e., the ratio between the spot size and the distance between the spots, between the fiber bundle and the micro mirrors of the MEMS device is substantially maintained. Furthermore, it is possible to employ optical splitters, e.g., between lenses 107 and 109, to create multiple signal paths through the system, e.g., to implement a multicast, broadcast, monitoring, protection and restoration functions. Advantageously, great flexibility in system design is achieved.

Each micro mirror of first input MEMS device 105 is set to reflect the beam of light incident on it at a respective prescribed angle. Each particular prescribed angle is selected so that the beam will be directed to a respective prescribed micro mirror on output MEMS device 115 that corresponds to the particular fiber of output fiber bundle 125 to which the light from that micro mirror is being directed as an output. Any error that results from the light having entered the imaging system traveling along a direction that is not parallel to the line formed by the center of its lens or collimator and its associated micro mirror on first input MEMS device is compensated for by the "training" of the all-optical system so long as deviation angle of the light from the parallel is small compared to the maximum angle at which the mirror can be tilted. "Training" is the process of determining what voltages need be applied to the electrodes of each micro mirror to achieve the necessary tilt that provides the best connection between it and each other micro mirror of the opposing MEMS device, and what voltage needs to be applied to the electrodes of each of the opposing micro mirrors as well.

After reflecting off of its particular micro mirror, each beam of light passes through optional lens 113 on its way to output MEMS device 115. Optional lens 113 acts as a field lens and translates the angle at which the light is incident onto each micro mirror into a position to which the light will be directed. This allows all the input micro mirrors to be homogenized, in that all micro mirrors having the same tilt will direct their light to the same position. Furthermore, the field lens refocuses each of the beams that pass through it, thus reducing loss.

The beams of light passing from lens 113 each falls upon a respective micro mirror of output MEMS device 115. Each micro mirror of output MEMS device 115 is set to reflect the beam of light incident on it at a respective prescribed angle. Each particular prescribed angle is selected so that each light beam will be directed towards the respective fiber of output fiber bundle 125 which is to be the output fiber for the light beam.

After reflecting off of its particular micro mirror and prior to reaching its respective output fiber, each beam of light passes through lens 117 and then lens 119, which together form an imaging system. The imaging system is arranged so as to cause an image of output MEMS device 115 to be formed at output micro lens array 123 and/or collimators 123, or vice-versa, due to the reversible nature of optics, thus effectively eliminating the distance between output MEMS device 115 and micro lens array and/or collimators 123 over which the light beams had effectively traveled in prior art arrangements. Thus, advantageously, each light beam, even if not traveling in the desired direction parallel to the line formed by the center of its micro lens or collimator and its associated micro mirror does not get the opportunity to travel away from its intended target.

As previously indicated in connection with the lens of the input imaging system, although two lenses are shown making up the imaging system, this is for pedagogical and clarity purposes only. Those of ordinary skill in the art will readily appreciate that any imaging system, e.g., a system using one or more lenses, may be employed. In one embodiment of the invention, a telecentric system is employed as the imaging system.

Note that the imaging system may also change the size of the image as compared with the original. This would allow the micro mirrors of output MEMS device 115 to have a different size and/or spacing than that of micro lens array and/or collimators 123. It would also allow the use of a fiber bundle without a micro lens array and/or collimators if the fill factor, i.e., the ratio between the spot size and the distance between the spots, between the fiber bundle and the micro mirrors of the MEMS device is substantially maintained. Furthermore, it is possible to employ optical splitters, e.g., between lenses 117 and 119, to create multiple signal paths through the system, e.g., to implement a multicast, broadcast, monitoring, protection and restoration functions. Advantageously, great flexibility in system design is achieved.

The beams of light passing from lens 119 passes through a respective micro lens of micro lens array 123. The function of each micro lens is to collimate the beam of light supplied to its respective associated input fiber. In alternative embodiments of the invention, in lieu of employing a separate micro lens array, a lens may be integrated onto each output fiber of fiber bundle 125, thus forming a collimator. The light from each of micro lens of micro lens array 123 then passes into the respective output fiber bundle that is associated with the micro lens.

Note that in some embodiments of the invention only one imaging system need be employed. In such embodiments the imaging system may be employed only for the input or only for the output.

The system shown in FIG. 1 provides a great improvement over the prior art arrangements. However, the performance is still somewhat limited, in that in FIG. 1 input MEMS device 105 is at an angle with respect to the plane at which the light beams are coming out from the fibers of input fiber bundle 101 and similarly output MEMS device 115 is at an angle with respect to the plane at which light is entering the fibers of output fiber bundle 125. As a result, the images of the fiber bundles formed by the respective imaging system are not exactly coplanar with their respective MEMS device, which causes the image to be slightly out of focus. Therefore, in accordance with an aspect of the invention, shown in FIG. 2 is an exemplary all-optical switching arrangement in which the optical path is arranged to allow at least one of the MEMS devices to be parallel to the plane of light entering or exiting the fibers of its respective fiber bundle.

Figure 2:
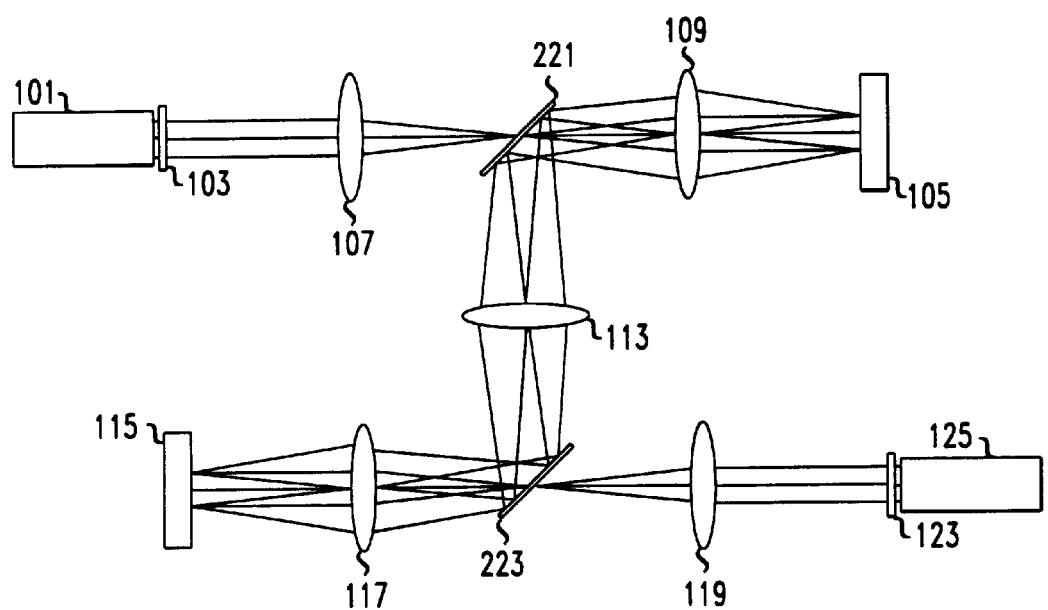
FIG. 2 is an exemplary all-optical switching arrangement in which the optical path is arranged to allow at least one of the MEMS devices to be parallel to the plane of light entering or exiting the fibers of its respective fiber bundle.

In addition to the elements of FIG. 1, FIG. 2 shows mirrors with a hole 221 and 223. As in FIG. 1, input fiber bundle 101 supplies optical signals to be switched. More specifically, each fiber of input fiber bundle 101 is an input port to the switching system of FIG. 1. The light supplied by each fiber of fiber bundle 101 passes through a respective corresponding micro lens that is part of micro lens array 103. The function of each micro lens is to collimate the beam of light supplied from its respective associated input fiber. In alternative embodiments of the invention, in lieu of employing a separate micro lens array, a lens may be integrated with each fiber of fiber bundle 101 in an arrangement that forms a collimator, so that the light comes out as a parallel beam.

In accordance with the principles of the invention, the beams of light passing from micro lens array 103 each falls upon the imaging system made up of lenses 107 and 109, entering at lens 107 and exiting at lens 109. The imaging system is arranged so as to cause an image of the micro lens array and/or the collimators to be formed at input MEMS device 105, or vice-versa, due to the reversible nature of optics, thus effectively eliminating the distance between micro lens array and/or collimators 103 and input MEMS device 105 over which the light beams had effectively traveled in prior art arrangements. Thus, advantageously, each light beam, even if not traveling in the desired direction parallel to the line formed by the center of its micro lens or collimator and its associated micro mirror does not get the opportunity to travel away from its intended target.

Note that although two lenses are shown making up the imaging system, this is for pedagogical and clarity purposes only. Those of ordinary skill in the art will readily appreciate that any imaging system, e.g., a system using one or more lenses, may be employed.

In one embodiment of the invention, a telecentric system, also known as a 4 f system is employed as the imaging system. By using a telecentric system, such systems being well known in the art, the angle of each beam as it exits from each of micro lens 107 is reproduced when that light reaches input MEMS device 105. However, advantageously, this angle is reproduced directly at the plane of input MEMS device 105. As a result, the light beams do not have the ability to travel along the line of that angle and thus do not have the opportunity afforded to them of missing the micro mirror which is supposed to reflect them.

Note that since the telecentric system may be inverting the respective corresponding micro mirrors of input MEMS device 105 may not be in the exact same location, e.g., on a direct line from input fiber bundle 101 as they would have been had the imaging system not been employed. The imaging system may also change the size of the image as compared with the original. This would allow the micro mirrors of input MEMS device 105 to have a different size and/or spacing than that of micro lens array and/or collimators 103. It would also allow the use of a fiber bundle without a micro lens array and/or collimators if the fill factor, i.e., the ratio between the spot size and the distance between the spots, between the fiber bundle and the micro mirrors of the MEMS device is substantially maintained. Furthermore, it is possible to employ optical splitters, e.g., between lenses 107 and 109, to create multiple signal paths through the system, e.g., to implement a multicast, broadcast, monitoring, protection and restoration functions. Advantageously, great flexibility in system design is achieved.

In accordance with an aspect of the invention, mirror with a hole 221 is inserted between lens 107 and 109 so that the hole of mirror with a hole 221 is at the focal point of lens 107. By having the hole of mirror with a hole 221 at the focal point of lens 107 all of the light entering the imaging system passes through the focal point and hence through the hole undisturbed by mirror 221. Light exiting the imaging system proceeds to input MEMS device 105, which is arranged to be parallel to the plane of light exiting input fiber bundle 101.

Each micro mirror of first input MEMS device 105 is set to reflect the beam of light incident on it at a respective prescribed angle. The particular prescribed angle is selected so that the beam will be directed to a prescribed micro mirror on output MEMS device 115 that corresponds to the particular fiber of output fiber bundle 125 to which the light is being directed as an output. Any error that results from the light having entered the imaging system traveling along a direction that is not parallel to the line formed by the center of its lens or collimator and its associated micro mirror is compensated for by the training of the all-optical system so long as deviation angle of the light from the parallel is small compared to the maximum angle at which the mirror can be tilted.

Note that at least the mirror in the center of input MEMS device 105 and output MEMS device 115 cannot be employed for switching. Likewise, depending on geometry and the size of the hole in the mirrors with a hole, it is possible that other micro mirrors surrounding the center micro mirror may not be useable as well.

After reflecting off of its particular micro mirror, each beam of light passes through an imaging system made up of lens 109, mirror with a hole 221 and lens 113. This imaging system produces an image of input MEMS device 105 at mirror with a hole 223. This image of input MEMS device can be considered to be a virtual input MEMS device. Light from the image of input MEMS device 105 reflect off of mirror with a hole 223 and goes toward output MEMS device 115, passing through lens 117. In this capacity, lens 117 acts as a field lens. The field lens translates the angle at which the light is incident onto each micro mirror into a position to which the light will be directed. This allows all the input micro mirrors to be homogenized, in that all micro mirrors having the same tilt will direct their light to the same position. Furthermore, the field lens refocuses each of the beams that pass through it, thus reducing loss.

The beams of light passing from the field lens each falls upon a respective micro mirror of output MEMS device 115. Each micro mirror of output MEMS device 115 is set to reflect the beam of light incident on it at a respective prescribed angle. Each particular prescribed angle is selected so that each light beam will be directed towards the respective fiber of output fiber bundle 125 which is to be the output fiber for the light beam.

After reflecting off of its particular micro mirror and prior to reaching its respective output fiber, each beam of light passes through lens 117 and then lens 119, which together form an imaging system. The imaging system is arranged so as to cause an image of output MEMS device 115 and/or the collimators to be formed at output micro lens array 123 and/or collimators 123, or vice-versa, due to the reversible nature of optics, thus effectively eliminating the distance between output MEMS device 115 and micro lens array and/or collimators 123 over which the light beams had effectively traveled in prior art arrangements. Thus, advantageously, each light beam, even if not traveling in the desired direction parallel to the line formed by the center of its micro lens or collimator and its associated micro mirror does not get the opportunity to travel away from its intended target.

As previously indicated in connection with the lens of the input imaging system, although two lenses are shown making up the imaging system, this is for pedagogical and clarity purposes only. Those of ordinary skill in the art will readily appreciate that any imaging system, e.g., a system using one or more lenses, may be employed. In one embodiment of the invention, a telecentric system is employed as the imaging system.

Note that the imaging system may also change the size of the image as compared with the original. This would allow the micro mirrors of output MEMS device 115 to have a different size and/or spacing than that of micro lens array and/or collimators 123. It would also allow the use of a fiber bundle without a micro lens array and/or collimators if the fill factor, i.e., the ratio between the spot size and the distance between the spots, between the fiber bundle and the micro mirrors of the MEMS device is substantially maintained. Furthermore, it is possible to employ optical splitters, e.g., between lenses 117 and 119, to create multiple signal paths through the system, e.g., to implement a multicast, broadcast, monitoring, protection and restoration functions. Advantageously, great flexibility in system design is achieved.

In accordance with an aspect of the invention, mirror with a hole 223 is inserted between lens 117 and 119 so that the hole of mirror with a hole 223 is at the focal point of the lens 117. By having the hole of mirror with a hole 223 at the focal point of the imaging system all of the light entering the imaging system passes through the focal point and hence through the hole undisturbed by mirror with a hole 223. Advantageously, output MEMS device 115 is arranged to be parallel to the plane of light entering output fiber bundle 125, thus eliminating the focus problem of the embodiment of FIG. 1.

Each beam of light passing from lens 119 passes through a respective micro lens of micro lens array 123. The function of each micro lens is to collimate the beam of light supplied to its respective associated input fiber. In alternative embodiments of the invention, in lieu of employing a separate micro lens array, a lens may be integrated onto each output fiber of fiber bundle 125, thus forming a collimator. The light from each of micro lens of micro lens array 123 then passes into the respective output fiber bundle that is associated with the micro lens.

Note that in some embodiments of the invention only one imaging system need be employed. In such embodiments the imaging system may be employed only for the input or only for the output. Note also that although in FIG. 2 the angle of the mirrors with a hole appears to be 45 degrees, such a particular angle is not required.

Any mirror with a hole may not have an actual physical hole but may employ in lieu thereof a region at the desired location of the hole that is transparent to the wavelength of light that is being switched by the all optical switch. The size required for the transparent area is directly proportional to the angle error of the light coming from lens array 103.

Figure 3:
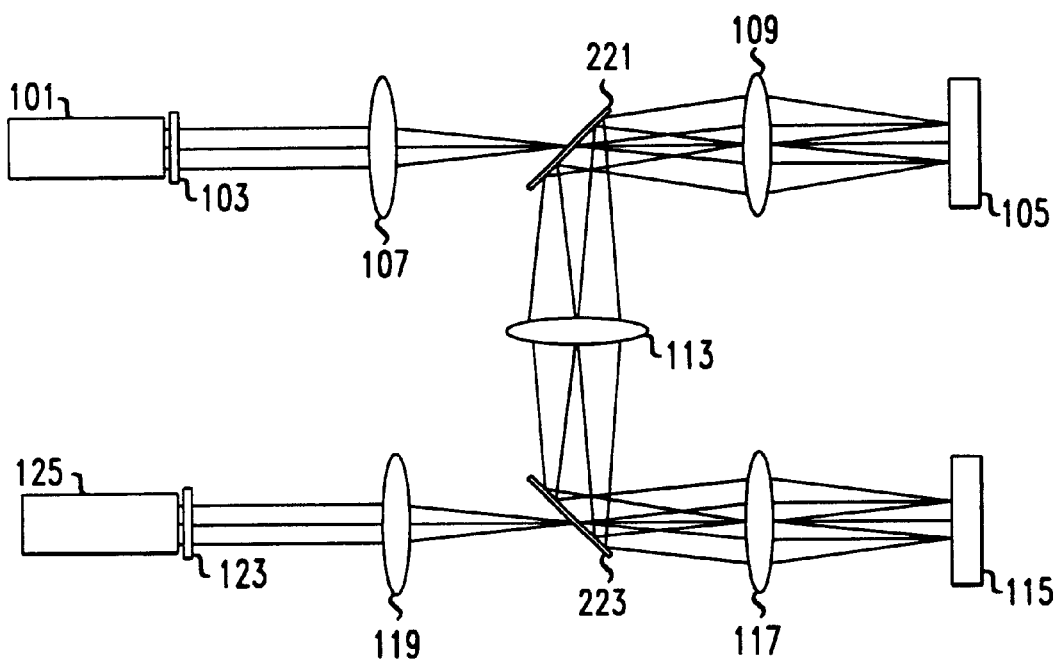
FIG. 3 shows another arrangement for the all-optical switching arrangement of FIG. 2 but in which mirrors with a hole are oriented to allow the input fiber bundle and the output fiber bundle to be on the same side of the path between the MEMS devices.

FIG. 3 shows another arrangement for the all-optical switching arrangement of FIG. 2 but in which mirrors with a hole 221 and 223 are oriented to allow input fiber bundle 101 and output fiber bundle 125 to be on the same side of the path between the MEMS devices. Optically, the paths and functionality are the same.

Figure 4:
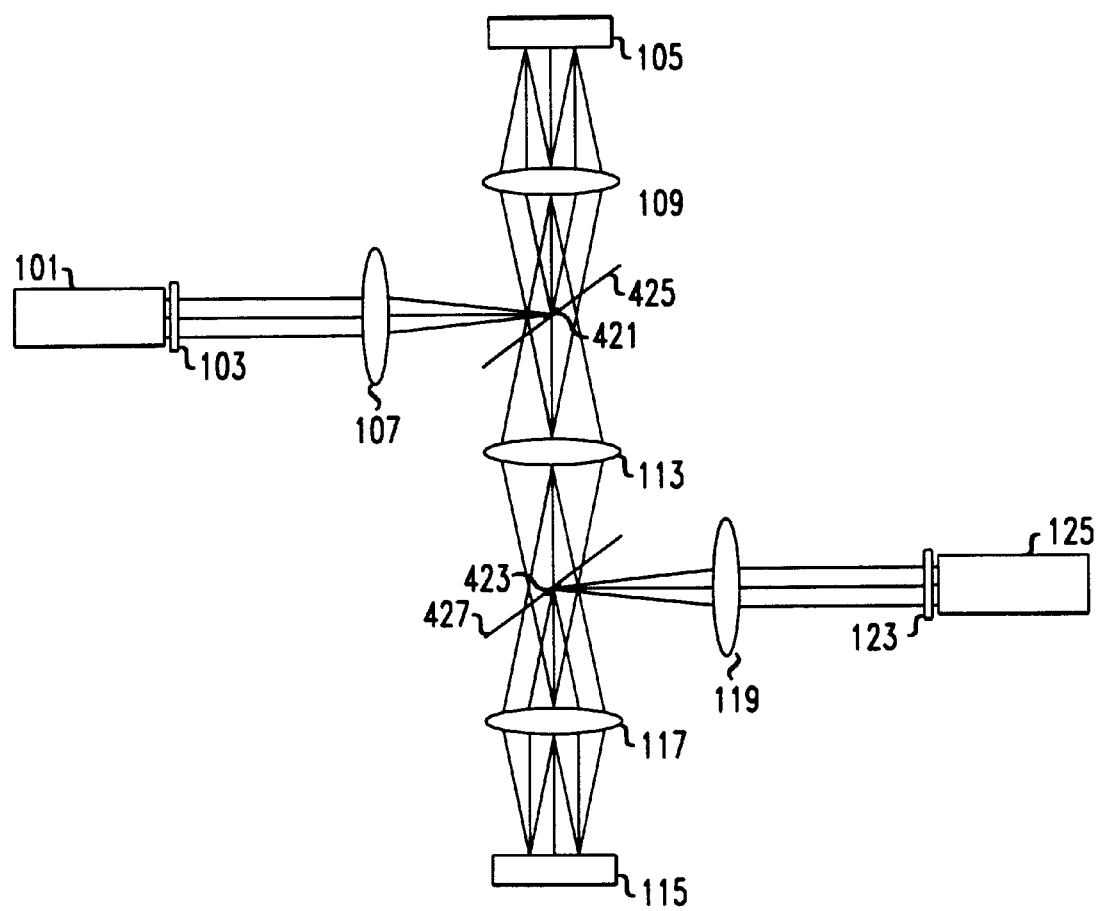
FIG. 4 shows another arrangement for the all-optical switching arrangement of FIG. 2 but in which instead of using mirrors with a hole it uses small mirrors at the focal points of various ones of the imaging system.

FIG. 4 shows another arrangement for the all-optical switching arrangement of FIG. 2 but in which instead of using mirrors with a hole 221 and 223 uses small mirrors 421 and 423 at the focal points of various ones of the imaging system. Small mirrors 421 and 423 may be mounted on glass plates 425 and 427, respectively to enable them to be supported outside of the optical path. Furthermore, instead of allowing at least one of the MEMS devices to be actually physically parallel to the plane of light entering or exiting the fibers of its respective fiber bundle, in the embodiment of FIG. 4, at least one of the MEMS devices is made to be optically parallel, i.e., virtually parallel, to the plane of light entering or exiting the fibers of its respective fiber bundle.

As in FIG. 2, input fiber bundle 101 supplies optical signals to be switched. More specifically, each fiber of input fiber bundle 101 is an input port to the switching system of FIG. 4. The light supplied by each fiber of fiber bundle 101 passes through a respective corresponding micro lens that is part of micro lens array 103. The function of each micro lens is to collimate the beam of light supplied from its respective associated input fiber. In alternative embodiments of the invention, in lieu of employing a separate micro lens array, a lens may be integrated with each fiber of fiber bundle 101 in an arrangement that forms a collimator, so that the light comes out as a parallel beam.

In accordance with the principles of the invention, the beams of light passing from micro lens array 103 each falls upon the imaging system made up of lenses 107 and 109, entering at lens 107 and exiting at lens 109. The imaging system is arranged so as to cause an image of the micro lens array and/or the collimators to be formed at input MEMS device 105, or vice-versa, due to the reversible nature of optics, thus effectively eliminating the distance between micro lens array and/or collimators 103 and input MEMS device 105 over which the light beams had effectively traveled in prior art arrangements. Thus, advantageously, each light beam, even if not traveling in the desired direction parallel to the line formed by the center of its micro lens or collimator and its associated micro mirror does not get the opportunity to travel away from its intended target.

Note that although two lenses are shown making up the imaging system, this is for pedagogical and clarity purposes only. Those of ordinary skill in the art will readily appreciate that any imaging system, e.g., a system using one or more lenses, may be employed.

In one embodiment of the invention, a telecentric system, also known as a 4 f system is employed as the imaging system. By using a telecentric system, such systems being well known in the art, the angle of each beam as it exits from each of micro lens 107 is reproduced when that light reaches input MEMS device 105. However, advantageously, this angle is reproduced directly at the plane of input MEMS device 105. As a result, the light beams do not have the ability to travel along the line of that angle and thus do not have the opportunity afforded to them of missing the micro mirror which is supposed to reflect them.

Note that since the telecentric system may be inverting the respective corresponding micro mirrors of input MEMS device 105 may not be in the exact same location, e.g., on a direct line from input fiber bundle 101 as they would have been had the imaging system not been employed. Note that the imaging system may also change the size of the image as compared with the original. This would allow the micro mirrors of input MEMS device 105 to have a different size and/or spacing than that of micro lens array and/or collimators 103. It would also allow the use of a fiber bundle without a micro lens array and/or collimators if the fill factor, i.e., the ratio between the spot size and the distance between the spots, between the fiber bundle and the micro mirrors of the MEMS device is substantially maintained. Furthermore, it is possible to employ optical splitters, e.g., between lenses 107 and 109, to create multiple signal paths through the system, e.g., to implement a multicast, broadcast, monitoring, protection and restoration functions. Advantageously, great flexibility in system design is achieved.

In accordance with an aspect of the invention, small mirror 421 is inserted between lens 107 and 109 so that small mirror 421 is at the focal point of the imaging system. By having small mirror 421 at the focal point of the imaging system all of the light entering the imaging system passes through the focal point and hence is reflected by small mirror 421, thus changing its direction toward lens 109. Light exiting the imaging system proceeds to input MEMS device 105, which is arranged to be optically parallel to the image of input fiber bundle 101 produced by the imaging system of lens 107 and 109.

Each micro mirror of first input MEMS device 105 is set to reflect the beam of light incident on it at a respective prescribed angle. Each particular prescribed angle is selected so that the beam will be directed to a prescribed micro mirror on output MEMS device 115 that corresponds to the particular fiber of output fiber bundle 125 to which the light is being directed as an output. Any error that results from the light having entered the imaging system traveling along a direction that is not parallel to the line formed by the center of its lens or collimator and its associated micro mirror is compensated for by the training of the all-optical system so long as deviation angle of the light from the parallel is small compared to the maximum angle at which the mirror can be tilted.

Note that at least the mirror in the center of input MEMS device 105 and output MEMS device 115 cannot be employed for switching. Likewise, depending on geometry and the size of the hole in the mirrors with a hole, it is possible that other micro mirrors surrounding the center micro mirror may not be useable as well.

After reflecting off of its particular micro mirror, each beam of light passes through an imaging system made up of lens 109 and lens 113. This imaging system produces an image of input MEMS device 105 at the plane which intersects small mirror 423 and is parallel to input MEMS device 105. This image of input MEMS device can be considered to be a virtual input MEMS device. Light from the image of input MEMS device 105 continues toward output MEMS device 115, passing through lens 117. In this capacity, lens 117 acts as a field lens. The field lens translates the angle at which the light is incident onto each micro mirror into a position to which the light will be directed. This allows all the input micro mirrors to be homogenized, in that all micro mirrors having the same tilt will direct their light to the same position. Furthermore, the field lens refocuses each of the beams that pass through it, thus reducing loss.

The beams of light passing from the field lens each falls upon a respective micro mirror of output MEMS device 115. Each micro mirror of output MEMS device 115 is set to reflect the beam of light incident on it at a respective prescribed angle. Each particular prescribed angle is selected so that each light beam will be directed towards the respective fiber of output fiber bundle 125 which is to be the output fiber for the light beam, had output fiber bundle 125 been along the path between output MEMS device 115 and input MEMS device 105.

However, after reflecting off of its particular micro mirror and prior to reaching its respective output fiber, each beam of light passes through an imaging system which is made up of lens 117, small mirror 423, and lens 119. The imaging system is arranged so as to cause an image of output MEMS device 115 to be formed at output micro lens array 123 and/or collimators 123, or vice-versa, due to the reversible nature of optics, which is located at a right angle to the path between output MEMS device 115 and input MEMS device 105. This change in direction is achieved by small mirror 423 which is located at the focal point of lens 117. The imaging system thus changes the direction of the optical path and it also effectively eliminates the distance between output MEMS device 115 and micro lens array and/or collimators 123 over which the light beams had effectively traveled in prior art arrangements. Thus, advantageously, each light beam, even if not traveling in the desired direction parallel to the line formed by the center of its micro lens or collimator and its associated micro mirror does not get the opportunity to travel away from its intended target.

As previously indicated in connection with the lens of the input imaging system, although two lenses are shown making up the imaging system, this is for pedagogical and clarity purposes only. Those of ordinary skill in the art will readily appreciate that any imaging system, e.g., a system using one or more lenses, may be employed. In one embodiment of the invention, a telecentric system is employed as the imaging system.

Note that the imaging system may also change the size of the image as compared with the original. This would allow the micro mirrors of output MEMS device 115 to have a different size and/or spacing than that of micro lens array and/or collimators 123. It would also allow the use of a fiber bundle without a micro lens array and/or collimators if the fill factor, i.e., the ratio between the spot size and the distance between the spots, between the fiber bundle and the micro mirrors of the MEMS device is substantially maintained. Furthermore, it is possible to employ optical splitters, e.g., between lenses 117 and 119, to create multiple signal paths through the system, e.g., to implement a multicast, broadcast, monitoring, protection and restoration functions. Advantageously, great flexibility in system design is achieved.

Each beam of light passing from lens 119 passes through a respective micro lens of micro lens array 123. The function of each micro lens is to collimate the beam of light supplied to its respective associated input fiber. In alternative embodiments of the invention, in lieu of employing a separate micro lens array, a lens may be integrated onto each output fiber of fiber bundle 125, thus forming a collimator. The light from each of micro lens of micro lens array 123 then passes into the respective output fiber bundle that is associated with the micro lens.

Figure 5:
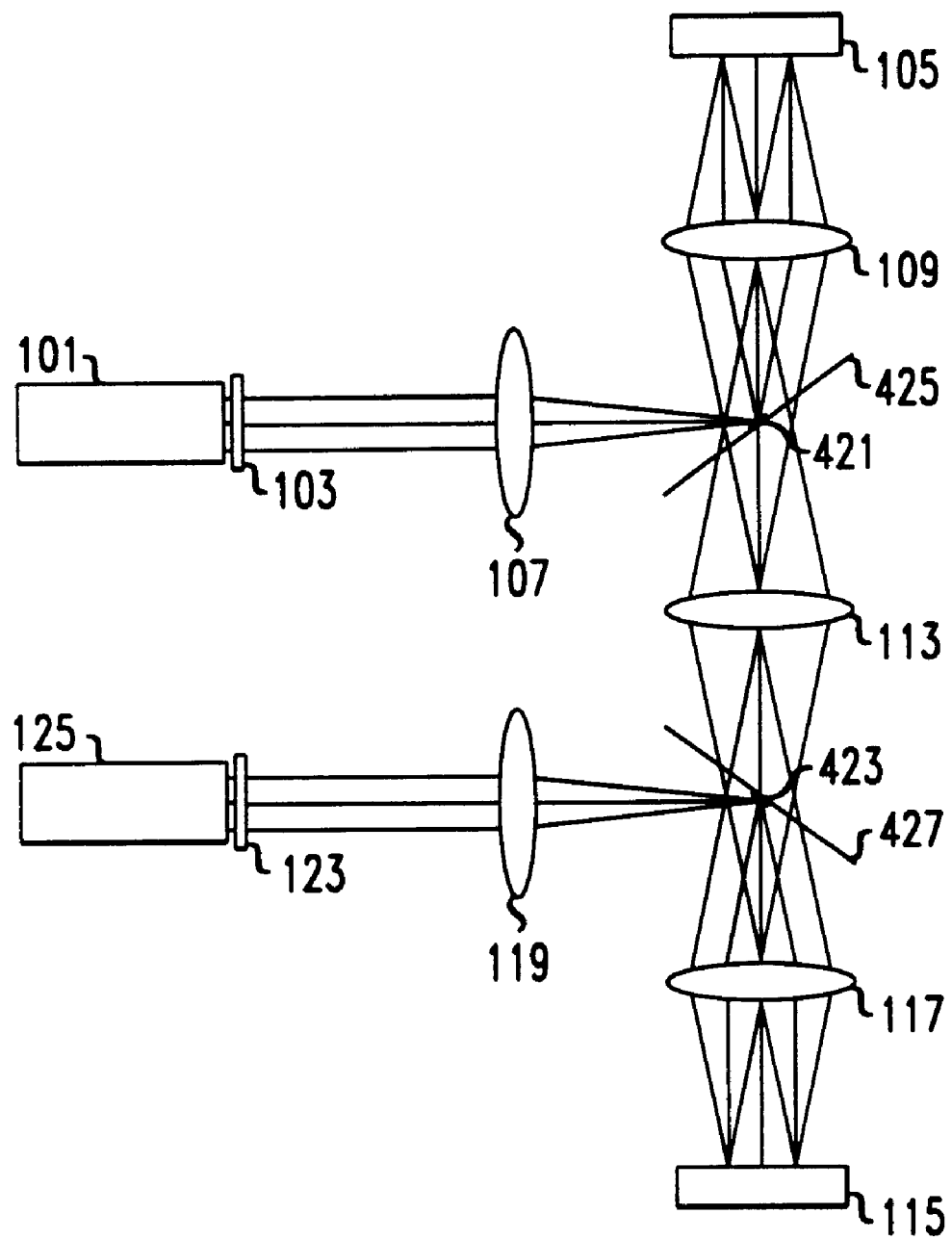
FIG. 5 shows another arrangement for the all-optical switching arrangement of FIG. 4 but in which the small mirrors are oriented to allow input fiber bundle and output fiber bundle to be on the same side of the path between the MEMS devices.

FIG. 5 shows another arrangement for the all-optical switching arrangement of FIG. 4 but in which small mirrors 421 and 423 are oriented to allow input fiber bundle 101 and output fiber bundle 125 to be on the same side of the path between the MEMS devices. Optically, the paths and functionality are the same.

Other arrangements with different angles may be easily developed by those of ordinary skill in the art using the principles disclosed herein whether for embodiments of the inventions using mirrors with a hole or embodiments of the invention using small mirrors, or any combination of mirrors with a hole and small mirrors.

Figure 6:
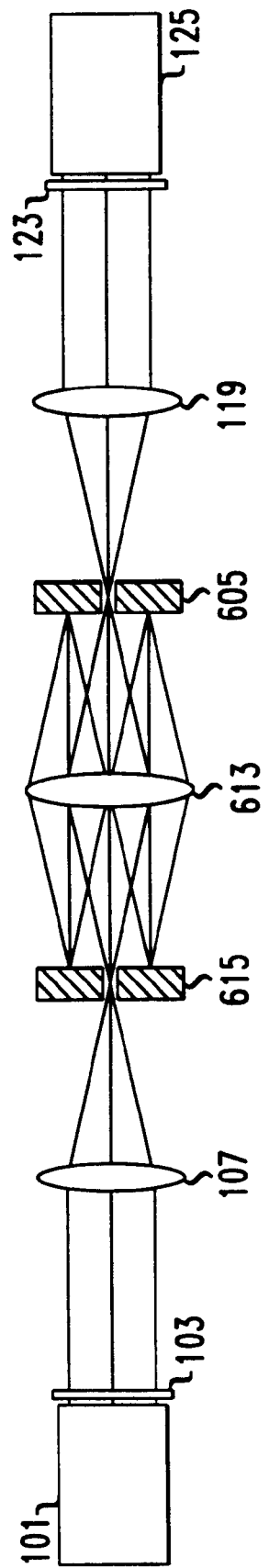
FIG. 6 shows another, simpler embodiment of an all-optical switching arrangement in accordance with the principles of the invention in which the optical path is arranged to allow at least one of the MEMS devices to be parallel to the plane of light entering or exiting the fibers of its respective fiber bundle.

FIG. 6 shows another, simpler embodiment of an all-optical switching arrangement in accordance with the principles of the invention in which the optical path is arranged to allow at least one of the MEMS devices to be parallel to the plane of light entering or exiting the fibers of its respective fiber bundle. Shown in FIG. 6 are a) input fiber bundle 101, b) input micro lens array 103, c) input MEMS device with a hole 605, d) lens 107, e) lens 613, f) output MEMS device with a hole 615, g) lens 119, h) output 30 micro lens array 123, and i) output fiber bundle 125.

Input fiber bundle 101 supplies optical signals to be switched. More specifically, each fiber of input fiber bundle 101 is an input port to the switching system of FIG. 6. The light supplied by each fiber of fiber bundle 101 passes through a respective corresponding micro lens that is part of micro lens array 103. The function of each micro lens is to collimate the beam of light supplied from its respective associated input fiber. In alternative embodiments of the invention, in lieu of employing a separate micro lens array, a lens may be integrated with each fiber of fiber bundle 101 in an arrangement that forms a collimator, so that the light comes out as a parallel beam In accordance with the principles of the invention, the beams of light passing from micro lens array 103 each falls upon the imaging system made up of lenses 107 and 613, entering at lens 107 and exiting at lens 613. The imaging system is arranged so as to cause an image of the micro lens array and/or the collimators to be formed at input MEMS device with a hole 605, or vice-versa, due to the reversible nature of optics, thus effectively eliminating the distance between micro lens array and/or collimators 103 and input MEMS device 105 over which the light beams had effectively traveled in prior art arrangements. Thus, advantageously, each light beam, even if not traveling in the desired direction parallel to the line formed by the center of its micro lens or collimator and its associated micro mirror does not get the opportunity to travel away from its intended target.

In accordance with an aspect of the invention, output MEMS device with a hole 615 is inserted between lens 107 and lens 613 so that the hole of output MEMS device with a hole 615 is at the focal point of lens 107. By having the hole of output MEMS device with a hole 615 at the focal point of lens 107, all of the light entering the imaging system passes through the focal point, and hence through the hole, undisturbed by output MEMS device with a hole 615. Light exiting the imaging system proceeds to input MEMS device with a hole 605, which is arranged to be parallel to the plane of light exiting input fiber bundle 101.

Note that although two lenses are shown making up the imaging system, this is for pedagogical and clarity purposes only. Those of ordinary skill in the art will readily appreciate that any imaging system, e.g., a system using one or more lenses, may be employed.

In one embodiment of the invention, a telecentric system, also known as a 4 f system is employed as the imaging system. By using a telecentric system, such systems being well known in the art, the angle of each beam as it exits from each of micro lens 107 is reproduced when that light reaches input MEMS device with a hole 605. However, advantageously, this angle is reproduced directly at the plane of input MEMS device with a hole 605. As a result, the light beams do not have the ability to travel along the line of that angle and thus do not have the opportunity afforded to them of missing the micro mirror which is supposed to reflect them.

In accordance with an aspect of the invention, input MEMS device 605 is inserted between lens 613 and 119 so that the hole of input MEMS device 605 is at the focal point of the lens 613.

Note that since the telecentric system may be inverting the respective corresponding micro mirrors of input MEMS device with a hole 605 may not be in the exact same location, e.g., on a direct line from input fiber bundle 101 as they would have been had the imaging system not been employed. The imaging system may also change the size of the image as compared with the original. This would allow the micro mirrors of input MEMS device with a hole 605 to have a different size and/or spacing than that of micro lens array and/or collimators 103. It would also allow the use of a fiber bundle without a micro lens array and/or collimators if the fill factor, i.e., the ratio between the spot size and the distance between the spots, between the fiber bundle and the micro mirrors of the MEMS device is substantially maintained. Furthermore, it is possible to employ optical splitters, e.g., between lenses 107 and 613, to create multiple signal paths through the system, e.g., to implement a multicast, broadcast, monitoring, protection and restoration functions. Advantageously, great flexibility in system design is achieved.

Each micro mirror of input MEMS device 605 is set to reflect the beam of light incident on it at a respective prescribed angle. The particular prescribed angle is selected so that the beam will be directed to a prescribed micro mirror on output MEMS device with a hole 615 that corresponds to the particular fiber of output fiber bundle 125 to which the light is being directed as an output. Any error that results from the light having entered the imaging system traveling along a direction that is not parallel to the line formed by the center of its lens or collimator and its associated micro mirror is compensated for by the training of the all-optical system so long as deviation angle of the light from the parallel is small compared to the maximum angle at which the mirror can be tilted.

After reflecting off of its particular micro mirror, each beam of light passes through lens 613, which acts as a field lens. The field lens translates the angle at which the light is incident onto each micro mirror into a position to which the light will be directed. This allows all the input micro mirrors to be homogenized, in that all micro mirrors having the same tilt will direct their light to the same position. Furthermore, the field lens refocuses each of the beams that pass through it, thus reducing loss.

The beams of light passing from the field lens each falls upon a respective micro mirror of output MEMS device with a hole 615. Each micro mirror of output MEMS device with a hole 615 is set to reflect the beam of light incident on it at a respective prescribed angle. Each particular prescribed angle is selected so that each light beam will be directed towards the respective fiber of output fiber bundle 125 which is to be the output fiber for the light beam.

After reflecting off of its particular micro mirror of output MEMS device with a hole 615 and prior to reaching its respective output fiber, each beam of light passes through lens 613 and then lens 119, which together form an imaging system. The imaging system is arranged so as to cause an image of output MEMS device with a hole 615 and/or the collimators to be formed at output micro lens array 123 and/or collimators 123, or vice-versa, due to the reversible nature of optics, thus effectively eliminating the distance between output MEMS device with a hole 615 and micro lens array and/or collimators 123 over which the light beams had effectively traveled in prior art arrangements. Thus, advantageously, each light beam, even if not traveling in the desired direction parallel to the line formed by the center of its micro lens or collimator and its associated micro mirror does not get the opportunity to travel away from its intended target.

As previously indicated in connection with the lens of the input imaging system, although two lenses are shown making up the imaging system, this is for pedagogical and clarity purposes only. Those of ordinary skill in the art will readily appreciate that any imaging system, e.g., a system using one or more lenses, may be employed. In one embodiment of the invention, a telecentric system is employed as the imaging system.

Note that the imaging system may also change the size of the image as compared with the original. This would allow the micro mirrors of output MEMS device with a hole 615 to have a different size and/or spacing than that of micro lens array and/or collimators 123. It would also allow the use of a fiber bundle without a micro lens array and/or collimators if the fill factor, i.e., the ratio between the spot size and the distance between the spots, between the fiber bundle and the micro mirrors of the MEMS device is substantially maintained. Furthermore, it is possible to employ optical splitters, e.g., between lenses 613 and 119, to create multiple signal paths through the system, e.g., to implement a multicast, broadcast, monitoring, protection and restoration functions. Advantageously, great flexibility in system design is achieved.

Each beam of light passing from lens 119 passes through a respective micro lens of micro lens array 123. The function of each micro lens is to collimate the beam of light supplied to its respective associated input fiber. In alternative embodiments of the invention, in lieu of employing a separate micro lens array, a lens may be integrated onto each output fiber of fiber bundle 125, thus forming a collimator. The light from each of micro lens of micro lens array 123 then passes into the respective output fiber bundle that is associated with the micro lens.

Figure 7:
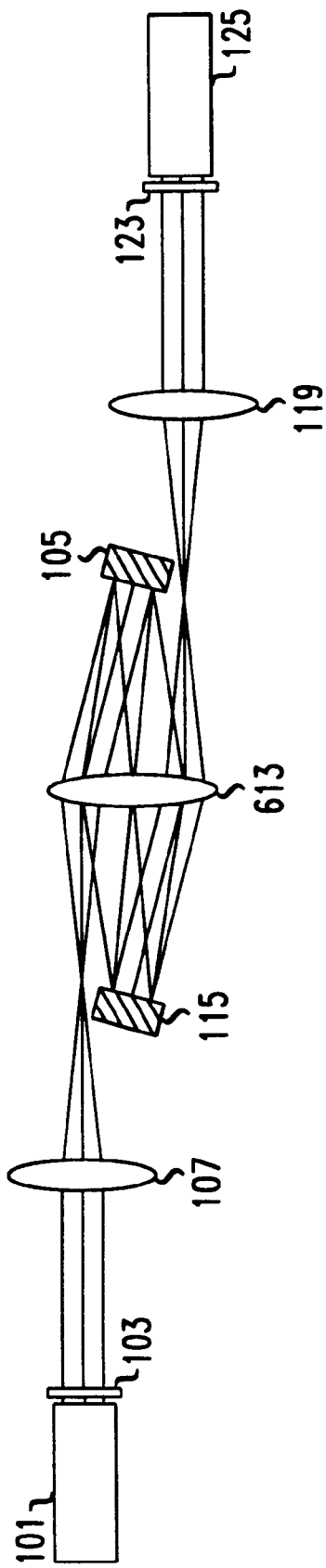
FIG. 7 shows another embodiment of the invention that does not require mirrors with holes or small mirrors.

Note that there can be no micro mirrors in the center of input MEMS device with a hole 605 or output MEMS device with a hole 615, and that, likewise, depending on geometry and the size of the hole in the MEMS devices with a hole, it is possible that other micro mirrors which would otherwise have existed surrounding the center of the micro mirror array may not be useable as well. The hole need not be an actual physical hole, but need only be an area that is transparent to the wavelengths of light being switched by the all optical switch. Further note that although the hole is shown and described as being in the "center" of the MEMS devices, it need not be in the center. Those of ordinary skill in the art will be able to place the hole at different locations and develop additional operational embodiments. Any changes in the lens arrangements or angles of the components to compensate for the different locations of the holes will be readily developed by those of ordinary skill in the art. Moreover, it is possible to eliminate the hole entirely by directing the light upward or downward to avoid hitting the MEMS device. Such an embodiment is shown in FIG. 7. Note that since the MEMS devices in FIG. 7 do not have holes they are simply referred to as input MEMS device and output MEMS device, and so are labeled respectively 105 and 115 as in FIGS. 1–6.

Figure 8:
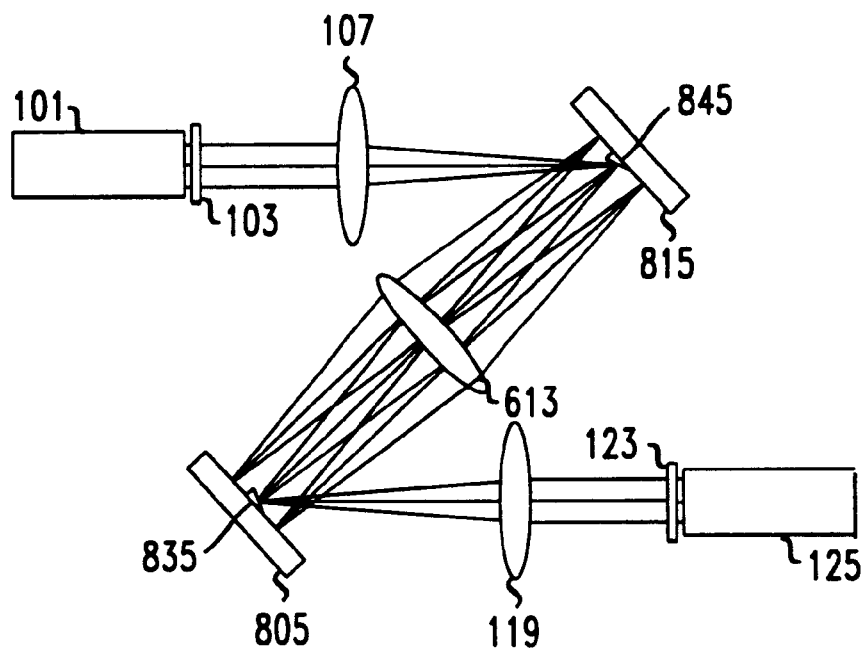
FIG. 8 shows another, simpler and more compact embodiment of the all-optical switching arrangement shown in FIG. 6.

FIG. 8 shows another, simpler and more compact embodiment of the all-optical switching arrangement shown in FIG. 6. Shown in FIG. 6 are a) input fiber bundle 101, b) input micro lens array 103, c) input MEMS device with a mirror 815, d) lens 107, e) lens 613, f) output MEMS device with a mirror 815, g) lens 119, h) output micro lens array 123, and i) output fiber bundle 125.

Input fiber bundle 101 supplies optical signals to be switched. More specifically, each fiber of input fiber bundle 101 is an input port to the switching system of FIG. 8. The light supplied by each fiber of fiber bundle 101 passes through a respective corresponding micro lens that is part of micro lens array 103. The function of each micro lens is to collimate the beam of light supplied from its respective associated input fiber. In alternative embodiments of the invention, in lieu of employing a separate micro lens array, a lens may be integrated with each fiber of fiber bundle 101 in an arrangement that forms a collimator, so that the light comes out as a parallel beam In accordance with the principles of the invention, the beams of light passing from micro lens array 103 each falls upon the imaging system made up of lenses 107 and 613, entering at lens 107 and exiting at lens 613. The imaging system is arranged so as to cause an image of the micro lens array and/or the collimators to be formed at input MEMS device with a mirror 805, or vice-versa, due to the reversible nature of optics, thus effectively eliminating the distance between micro lens array and/or collimators 103 and input MEMS device 105 over which the light beams had effectively traveled in prior art arrangements. Thus, advantageously, each light beam, even if not traveling in the desired direction parallel to the line formed by the center of its micro lens or collimator and its associated micro mirror does not get the opportunity to travel away from its intended target.

In accordance with an aspect of the invention, output MEMS device with a mirror 815 is optically between lens 107 and lens 613, so that mirror 845 of output MEMS device with a mirror 815 is at the focal point of lens 107. The mirror referred to when indicating a MEMS device with a mirror is a mirror that is included on the MEMS device but which is not moved during operation of the optical switch as are the other micro mirrors which are incorporated on the MEMS device. This mirror may be a distinct fixed mirror that is manufactured or otherwise incorporated on the MEMS device, or it may be a micro mirror that is set to a fixed tilt. For output MEMS device with a mirror 815 the mirror is mirror 845 while for input MEMS device with a mirror 805 the mirror is mirror 835.

Figure 10:
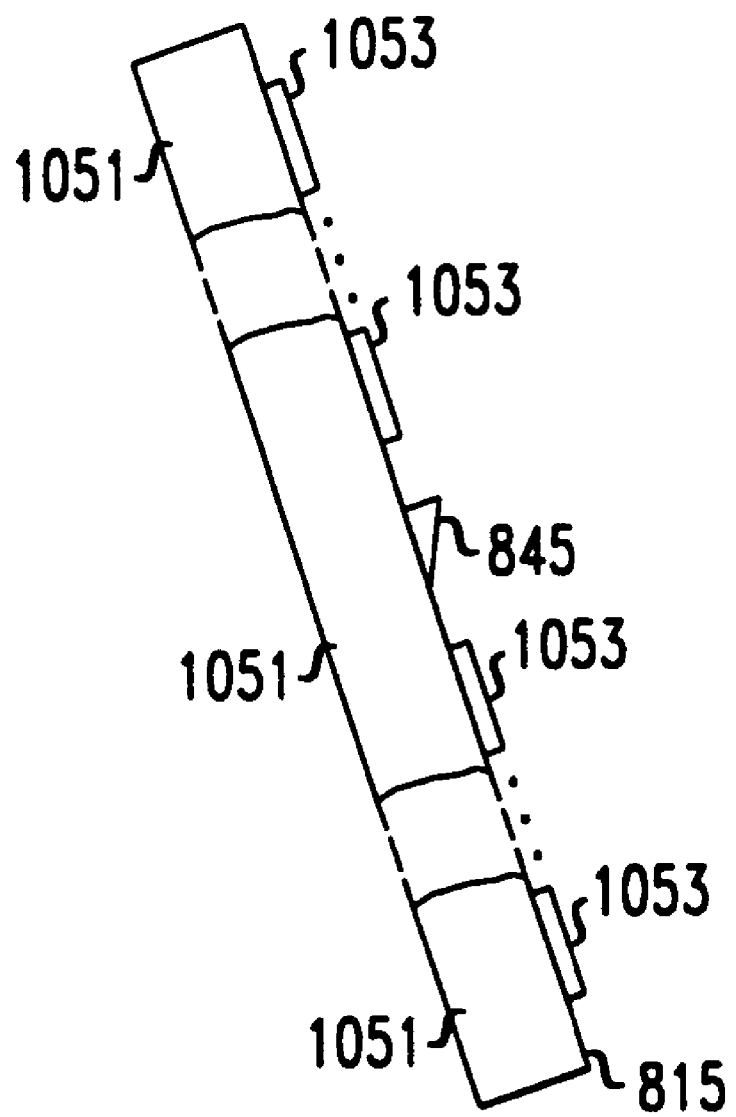
FIG. 10 shows an expanded view of a portion of an output MEMS device with a mirror of FIG. 8.

FIG. 10 shows an expanded view of a portion of output MEMS device with a mirror 815. Shown in FIG. 10 are MEMS device substrate 1051, micro mirrors 1053 and mirror 835. Micro mirrors 1053 are free to be tilted, but mirror 835 is maintained with a fixed tilt. Input MEMS device with a mirror 845 has the same structure.

By having mirror 845 of output MEMS device with a mirror 815 at the focal point of lens 107 all of the light entering the imaging system passes through the focal point, and hence is reflected by mirror 845 of output MEMS device with a mirror 815. Light exiting the imaging system proceeds to input MEMS device with a mirror 805.

Note that although two lenses are shown making up the imaging system, this is for pedagogical and clarity purposes only. Those of ordinary skill in the art will readily appreciate that any imaging system, e.g., a system using one or more lenses, may be employed.

In one embodiment of the invention, a telecentric system, also known as a 4 f system is employed as the imaging system. By using a telecentric system, such systems being well known in the art, the angle of each beam as it exits from each of micro lens 107 is reproduced when that light reaches input MEMS device with a mirror 805. However, advantageously, this angle is reproduced directly at the plane of input MEMS device with a mirror 805. As a result, the light beams do not have the ability to travel along the line of that angle and thus do not have the opportunity afforded to them of missing the micro mirror which is supposed to reflect them.

Note that since the telecentric system may be inverting the respective corresponding micro mirrors of input MEMS device with a mirror 805 may not be in the exact same location, e.g., on a direct line from input fiber bundle 101 as they would have been had the imaging system not been employed. The imaging system may also change the size of the image as compared with the original. This would allow the micro mirrors of input MEMS device with a mirror 805 to have a different size and/or spacing than that of micro lens array and/or collimators 103. It would also allow the use of a fiber bundle without a micro lens array and/or collimators if the fill factor, i.e., the ratio between the spot size and the distance between the spots, between the fiber bundle and the micro mirrors of the MEMS device is substantially maintained. Furthermore, it is possible to employ optical splitters, e.g., between lenses 107 and 613, to create multiple signal paths through the system, e.g., to implement a multicast, broadcast, monitoring, protection and restoration functions. Advantageously, great flexibility in system design is achieved.

Each micro mirror of input MEMS device 605 is set to reflect the beam of light incident on it at a respective prescribed angle. Each particular prescribed angle is selected so that the beam will be directed to a prescribed micro mirror on output MEMS device with a mirror 815 that corresponds to the particular fiber of output fiber bundle 125 to which the light is being directed as an output. Any error that results from the light having entered the imaging system traveling along a direction that is not parallel to the line formed by the center of its lens or collimator and its associated micro mirror is compensated for by the training of the all-optical system so long as deviation angle of the light from the parallel is small compared to the maximum angle at which the mirror can be tilted.

After reflecting off of its particular micro mirror, each beam of light passes through lens 613, which acts as a field lens. The field lens translates the angle at which the light is incident onto each micro mirror into a position to which the light will be directed. This allows all the input micro mirrors to be homogenized, in that all micro mirrors having the same tilt will direct their light to the same position. Furthermore, the field lens refocuses each of the beams that pass through it, thus reducing loss.

The beams of light passing from the field lens each falls upon a respective micro mirror of output MEMS device with a mirror 815. Each micro mirror of output MEMS device with a mirror 815 is set to reflect the beam of light incident on it at a respective prescribed angle. The particular prescribed angle is selected so that each light beam will be directed towards the respective fiber of output fiber bundle 125 which is to be the output fiber for the light beam.

After reflecting off of its particular micro mirror and prior to reaching its respective output fiber, each beam of light passes through lens 613 and then lens 119, which together form an imaging system. The imaging system is arranged so as to cause an image of output MEMS device with a mirror 815 and/or the collimators to be formed at output micro lens array 123 and/or collimators 123, or vice-versa, due to the reversible nature of optics, thus effectively eliminating the distance between output MEMS device with a mirror 815 and micro lens array and/or collimators 123 over which the light beams had effectively traveled in prior art arrangements. Thus, advantageously, each light beam, even if not traveling in the desired direction parallel to the line formed by the center of its micro lens or collimator and its associated micro mirror does not get the opportunity to travel away from its intended target.

In accordance with an aspect of the invention, input MEMS device with a mirror 805 is inserted between lens 613 and 119 so that mirror 835 of input MEMS device with a mirror 805 is at the focal point of the lens 613. By having mirror 835 of input MEMS device with a mirror 835 at the focal point of the imaging system all of the light entering the imaging system passes through the focal point and hence is reflected by mirror 835 of input MEMS device with a mirror 805.

As previously indicated in connection with the lens of the input imaging system, although two lenses are shown making up the imaging system, this is for pedagogical and clarity purposes only. Those of ordinary skill in the art will readily appreciate that any imaging system, e.g., a system using one or more lenses, may be employed. In one embodiment of the invention, a telecentric system is employed as the imaging system.

Note that the imaging system may also change the size of the image as compared with the original. This would allow the micro mirrors of output MEMS device with a mirror 815 to have a different size and/or spacing than that of micro lens array and/or collimators 123. It would also allow the use of a fiber bundle without a micro lens array and/or collimators if the fill factor, i.e., the ratio between the spot size and the distance between the spots, between the fiber bundle and the micro mirrors of the MEMS device is substantially maintained. Furthermore, it is possible to employ optical splitters, e.g., between lenses 613 and 119, to create multiple signal paths through the system, e.g., to implement a multicast, broadcast, monitoring, protection and restoration functions. Advantageously, great flexibility in system design is achieved.

Each beam of light passing from lens 119 passes through a respective micro lens of micro lens array 123. The function of each micro lens is to collimate the beam of light supplied to its respective associated input fiber. In alternative embodiments of the invention, in lieu of employing a separate micro lens array, a lens may be integrated onto each output fiber of fiber bundle 125, thus forming a collimator. The light from each of micro lens of micro lens array 123 then passes into the respective output fiber bundle that is associated with the micro lens.

Note that there can be no micro mirrors employed for switching where the mirror of a MEMS device with a mirror is located. Further note that although the mirror is shown and described as being in the "center" of the MEMS devices, it need not be in the center. Those of ordinary skill in the art will be able to place the mirror at different locations and develop additional operational embodiments. Any changes in the lens arrangements or angles of the components to compensate for the different locations of the holes will be readily developed by those of ordinary skill in the art.

In the foregoing, designations of input and output fiber bundles, MEMS devices, and the like are primarily for pedagogical purposes, because each cross connected fiber pair may actually have between them a bi-directional connection. However, an input fiber may not receive light to output from any output fiber other than the one to which the input fiber's light is being directed as an output.

Figure 9:
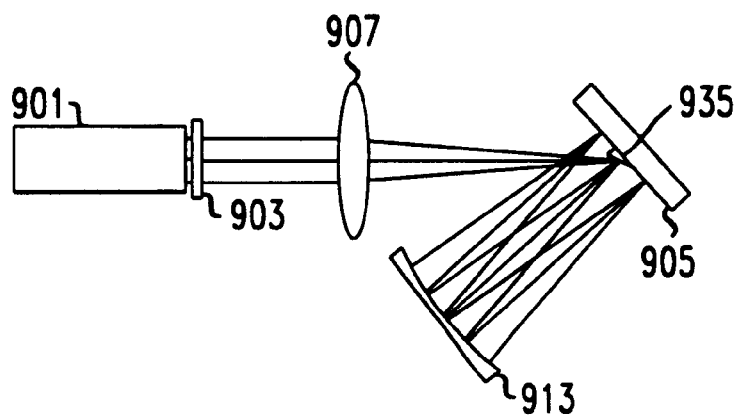
FIG. 9 shows folded embodiment of the all-optical switching arrangement shown in FIG. 8.

FIG. 9 shows folded embodiment of the all-optical switching arrangement shown in FIG. 8. Shown in FIG. 9 are a) fiber bundle 901, b) micro lens array 903, c) MEMS device with a mirror 905, d) lens 907, and e) curved mirror 913. Unlike the previously described embodiments, fiber bundle 901 contains both input fibers, which supply light, and output fibers, which receive light, so that fiber bundle 901 acts as both input and output ports. However, such designations of input and output fibers are primarily for pedagogical purposes, because each cross connected fiber pairs may actually have between them a bi-directional connection. Any particular fiber which the user designates as an input fiber can be paired with any other fiber which the user may choose to designate as an output fiber.

Light supplied from input fibers of fiber bundle 901 passes through a respective associated micro lens of first micro lens array 903. The function of each micro lens is to collimate the beam of light supplied from its respective associated input fiber. In alternative embodiments of the invention, in lieu of employing a separate micro lens array, a lens may be integrated with each fiber of fiber bundle 901 in an arrangement that forms a collimator, so that the light comes out as a parallel beam.

In accordance with the principles of the invention, the beams of light passing from micro lens array 903 each falls upon the imaging system made up of lens 907, mirror 935 of MEMS device with a mirror 905, and curved mirror 913. The light enters at lens 907 and exits at curved mirror 913 after having been redirected at mirror 925, which is substantially at the focal point of lens 907. Mirror 935 is also located substantially at the focal point of curved mirror 935. The imaging system is arranged so as to cause an image of the micro lens array and/or the collimators to be formed at MEMS device with a mirror 905, or vice-versa, due to the reversible nature of optics, thus effectively eliminating the distance between micro lens array and/or collimators 903 and MEMS device with a mirror 905 over which the light beams had effectively traveled in prior art arrangements. Thus, advantageously, each light beam, even if not traveling in the desired direction parallel to the line formed by the center of its micro lens or collimator and its associated micro mirror does not get the opportunity to travel away from its intended target.

MEMS device with a mirror 905 has the same structure as MEMS device with a mirror 815 which is shown in FIG. 10.

By having the mirror of MEMS device with a mirror 905 at the focal point of lens 907 all of the light entering the imaging system passes through the focal point, and hence is reflected by mirror 935 of MEMS device with a mirror 905. Light exiting the imaging system proceeds to MEMS device with a mirror 905.

In one embodiment of the invention, a telecentric system, also known as a 4 f system is employed as the imaging system. By using a telecentric system, such systems being well known in the art, the angle of each beam as it exits from each of micro lens 903 is reproduced when that light reaches the MEMS device with a mirror 905. However, advantageously, this angle is reproduced directly at the plane of MEMS device with a mirror 905. As a result, the light beams do not have the ability to travel along the line of that angle and thus do not have the opportunity afforded to them of missing the micro mirror which is supposed to reflect them.

Note that since the telecentric system may be inverting the respective corresponding micro mirrors of input MEMS device with a mirror 905 may not be in the exact same location, e.g., on a direct line from input fiber bundle 901 as they would have been had the imaging system not been employed. Note that the imaging system may also change the size of the image as compared with the original. This would allow the micro mirrors of MEMS device with a mirror 905 to have a different size and/or spacing than that of micro lens array and/or collimators 903. It would also allow the use of a fiber bundle without a micro lens array and/or collimators if the fill factor, i.e., the ratio between the spot size and the distance between the spots, between the fiber bundle and the micro mirrors of the MEMS device is substantially maintained. Furthermore, it is possible to employ optical splitters, e.g., between lens 907 and curved mirror 913, to create multiple signal paths through the system, e.g., to implement a multicast, broadcast, monitoring, protection and restoration functions. Advantageously, great flexibility in system design is achieved.

Each micro mirror of MEMS device 905 is set to reflect the beam of light incident on it at a respective prescribed angle. Each particular prescribed angle is selected so that the beam will be directed to a prescribed micro mirror on MEMS device with a mirror 905 that corresponds to the particular output fiber of fiber bundle 901 to which the light is being directed as an output after the light is reflected by curved mirror 913, which also performs the function of a field lens. The field lens function translates the angle at which the light is incident onto each micro mirror into a position to which the light will be directed. This allows all the input micro mirrors to be homogenized, in that all micro mirrors having the same tilt will direct their light to the same position. Furthermore, the field lens refocuses each of the beams that pass through it, thus reducing loss. Any error that results from the light having entered the imaging system traveling along a direction that is not parallel to the line formed by the center of its lens or collimator and its associated micro mirror is compensated for by the training of the all-optical system so long as deviation angle of the light from the parallel is small compared to the maximum angle at which the mirror can be tilted.

The beams of light passing back from the curved mirror 913 each falls upon a respective micro mirror of MEMS device with a mirror 905 which is an output micro mirror in that it is used to direct the light to a particular fiber of fiber bundle 101 via which the light will be supplied as an output. Each output micro mirror of MEMS device with a mirror 905 is set to reflect the beam of light incident on it at a respective prescribed angle selected so that each light beam will be directed towards its respective output fiber of fiber bundle 901.

After reflecting off of its particular output micro mirror and prior to reaching its respective output fiber, each beam of light passes through the imaging system formed by curved mirror 913, mirror 935, and lens 907. This imaging system is the same imaging system through which the input light beams initially passed. As previously explained, the imaging system is arranged so as to cause an image of MEMS device with a mirror 905 to be formed at micro lens array 903 and/or collimators 903, or vice-versa, due to the reversible nature of optics, thus effectively eliminating the distance between output MEMS device with a mirror 905 and micro lens array and/or collimators 903 over which the light beams had effectively traveled in prior art arrangements. Thus, advantageously, each light beam, even if not traveling in the desired direction parallel to the line formed by the center of its micro lens or collimator and its associated micro mirror does not get the opportunity to travel away from its intended target.

Each output beam of light passing from lens 907 passes through a respective micro lens of micro lens array 903. The light from each of micro lens of micro lens array 903 then passes into the respective output fiber of fiber bundle 901 that is associated with the micro lens.

Note that there can be no micro mirrors employed for switching where the mirror of a MEMS device with a mirror is located. Further note that although the mirror is shown and described as being in the "center" of the MEMS devices, it need not be in the center. Those of ordinary skill in the art will be able to place the mirror at different locations and develop additional operational embodiments. Any changes in the lens arrangements or angles of the components to compensate for the different locations of the holes will be readily developed by those of ordinary skill in the art.

As noted, the embodiment of FIG. 9 is a folded version of the invention. Those of ordinary skill in the art will readily be able to develop folded versions of other embodiments of the invention.

Note that instead of optical fibers supplying the light beams as inputs, they may be supplied by an optical source, e.g., a laser or light emitting diode, planar wave guides, or the like. Likewise, instead of having optical fibers receiving the light beams as outputs the light beams could be received by other receivers such as photo detectors, planar wave guides, or the like.

What is claimed is:

1. An optical switch, comprising
   a first micro-electromechanical system (MEMS) device containing a first number of micro mirrors;
   a first imaging system optically coupled at one end thereof to said first MEMS device so as to produce an image of said first MEMS device at the end of said first imaging system opposite to said end of said first imaging system at which said first MEMS device is coupled;
   wherein said image of said first MEMS device is substantially in a plane with at least one member of the set consisting of inputs to said optical switch and outputs of said optical switch.

2. The invention as defined in claim 1 wherein at least one of said inputs to said optical switch and outputs of said optical switch is a fiber bundle.

3. The invention as defined in claim 1 wherein at least one of said inputs to said optical switch and outputs of said optical switch is a micro lens array optically coupled to a fiber bundle.

4. The invention as defined in claim 1 wherein at least one of said inputs to said optical switch and outputs of said optical switch is a plurality of collimators at the end of a fiber bundle.

5. The invention as defined in claim 1 wherein an element of said first imaging system also functions as a field lens for said all optical switch.

6. The invention as defined in claim 1 further comprising a field lens through which light reflected from said first MEMS device passes.

7. The invention as defined in claim 1 further comprising a curved mirror positioned to perform the function of a field lens and which reflects light on an optical path that had been reflected from said first MEMS device.

8. The invention as defined in claim 1 wherein said first MEMS device is a MEMS device with a mirror.

9. The invention as defined in claim 8 mirror is located substantially at a focal point of said first imaging system.

10. The invention as defined in claim 1 wherein said first MEMS device has an area that is transparent to light at at least some wavelengths that are being switched by said all optical switch.

11. The invention as defined in claim 10 wherein said transparent area is a hole.

12. The invention as defined in claim 10 wherein said transparent area is located substantially at a focal point of said first imaging system.

13. The invention as defined in claim 1 wherein light passing through said first imaging system passes through a transparent area of a mirror, said transparent area being transparent to at least some wavelengths being switched by said optical system and being within the optical path of said first imaging system while the rest of said mirror is not within the optical path of said imaging system.

14. The invention as defined in claim 13 wherein said transparent area is a hole.

15. The invention as defined in claim 1 wherein said first imaging system comprises a lens and a curved mirror.

16. The invention as defined in claim 1 wherein said first imaging system is a telecentric imaging system.

17. The invention as defined in claim 1 wherein said first imaging system is a 4 f system.

18. The invention as defined in claim 1 wherein said first imaging system reproduces at its exit the angle at which light entered it.

19. The invention as defined in claim 1 further comprising:
   a second micro-electromechanical system (MEMS) device containing a second number of micro mirrors; and
   a second imaging system optically coupled device at one end thereof to said second MEMS so as to produce an image of said second MEMS device at the end of said second imaging system opposite to said end of said second imaging system at which said second MEMS device is coupled;
   wherein said image of said first MEMS device is substantially in a plane with only one member of said set and said second MEMS device is substantially in a plane with the other member of said set; and
   wherein light reflected by at least one of said micro mirrors of said first MEMS device is reflected by at least one of said micro mirrors of said second MEMS device.

20. The invention as defined in claim 19 wherein at least one lens is shared by said first imaging system and said second imaging system.

21. The invention as defined in claim 19 wherein said first and second number are the same.

22. An all optical switch, comprising:
   an imaging system located between
      a first micro-electromechanical system (MEMS) device containing a plurality of micro mirrors; and
      at least one of the group consisting of an input and an output to said all optical switch.

23. An optical switch, comprising:
   first micro-electromechanical system (MEMS) means containing a first number of micro mirrors means;
   first means for imaging which is optically coupled to said first MEMS means at one end of said first imaging means for producing an image of said first MEMS means at the end of said first imaging means which is opposite to said end of said first imaging means at which said first MEMS means is located;
   wherein said image of said first MEMS means is substantially in a plane with at least one of a set consisting of means for inputting light to said optical switch and means for outputting light from said optical switch.

24. The invention as defined in claim 23 further comprising a field lens functionality means which processes light reflected from said first MEMS means.

25. The invention as defined in claim 23 further comprising:
   a second micro-electromechanical system (MEMS) means containing a second number of micro mirror means; and
   second means for imaging which is optically coupled to said second MEMS means at one end of said second imaging means for producing an image of said second MEMS means at the end of said second imaging means which is opposite to said end of said second imaging means at which said second MEMS means is located;
   wherein said image of said first MEMS means is substantially in a plane with only one member of said set and said second MEMS means is substantially in a plane with at least the other member of said set; and
   wherein light reflected by at least one of said micro mirror means of said first MEMS means is reflected by at least one of said micro mirror means of said second MEMS means.

26. A method for use in an all optical switch, comprising the step of imaging a first micro-electromechanical system (MEMS) device containing a first number of micro mirrors so as to produce an image of said first MEMS device substantially in a plane with at least one of the set consisting of inputs to said optical switch and outputs of said optical switch.

27. The method as defined in claim 26 further comprising the step of passing light rays which form said image through a transparent area contained within a mirror substantially when said light rays substantially meet at a focal point.

28. The method as defined in claim 26 further wherein comprising the step of reflecting light rays which form said image off of a mirror on said MEMS device which has a fixed tilt substantially when said light rays substantially meet at a focal point.

* * * * *